US012386701B2

(12) United States Patent
Wu (10) Patent No.: US 12,386,701 B2
(45) Date of Patent: Aug. 12, 2025

(54) MEMORY CHIPS AND OPERATING METHODS THEREOF (71) Applicant: WUHAN XINXIN SEMICONDUCTOR MANUFACTURING CO., LTD., Hubei (CN)

(72) Inventor: Bin Wu, Wuhan (CN)

(*) Notice: Subject to any disclaimer, the term of this patent is extended or adjusted under 35 U.S.C. 154(b) by 6 days.

(21) Appl. No.: 18/544,555

(22) Filed: Dec. 19, 2023

(65) Prior Publication Data
US 2025/0173218 A1    May 29, 2025

(30) Foreign Application Priority Data

Nov. 28, 2023  (CN) .......................... 202311614381.8

(51) Int. Cl.
G06F 11/10    (2006.01)
G06F 9/448    (2018.01)

(52) U.S. Cl.
CPC ........ *G06F 11/1068* (2013.01); *G06F 9/4498* (2018.02); *G06F 11/1004* (2013.01)

(58) Field of Classification Search
None
See application file for complete search history.

(56) References Cited

U.S. PATENT DOCUMENTS

| 5,438,575 A * | 8/1995 | Bertrand | G06F 5/10 |
| | | | 714/799 |
| 6,584,543 B2 * | 6/2003 | Williams | G06F 11/1052 |
| | | | 711/170 |
| 6,611,938 B1 * | 8/2003 | Tanaka | G11C 16/0483 |
| | | | 714/763 |
| 9,575,125 B1 * | 2/2017 | Andre | G11C 29/10 |
| 9,880,896 B2 * | 1/2018 | Coteus | G06F 11/0772 |
| 10,204,008 B2 * | 2/2019 | Trezise | G11C 29/42 |
| 10,289,482 B2 * | 5/2019 | Kodera | G06F 11/1068 |
| 2005/0251728 A1 * | 11/2005 | Stocken | G11C 29/42 |
| | | | 714/763 |
| 2009/0113272 A1 * | 4/2009 | Tan | G06F 11/1052 |
| | | | 714/765 |
| 2012/0278681 A1 * | 11/2012 | Moyer | G06F 11/1016 |
| | | | 714/763 |

(Continued)

OTHER PUBLICATIONS

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017. (Year: 2017).*

*Primary Examiner* — Daniel F. McMahon
(74) *Attorney, Agent, or Firm* — JMB DAVIS BEN-DAVID (57) ABSTRACT

This disclosure relates to a memory chip and an operating method thereof, which determines an operating state of a storage space corresponding to a write instruction, the operating state including an error correction protection state and a multiple programmed state and being represented by, for example, flag bits and error correction bits, and enables, in a later reading process, an error correction mechanism for the storage space in the error correction protection state, or disables the error correction mechanism for the storage space in the multiple programmed state. In this way, the storage space in the multiple programmed state may be recognized, allowing performing multiple programming operations thereon.

20 Claims, 5 Drawing Sheets (56) References Cited

U.S. PATENT DOCUMENTS

| | | | |
|---|---|---|---|
| 2013/0297985 A1* | 11/2013 | Yang | H03M 13/3746 |
| | | | 714/759 |
| 2015/0248316 A1* | 9/2015 | Mogul | G06F 11/0763 |
| | | | 714/6.11 |
| 2018/0336090 A1* | 11/2018 | Minzoni | G06F 11/1044 |

* cited by examiner

MEMORY CHIPS AND OPERATING METHODS THEREOF

CROSS-REFERENCE TO RELATED APPLICATION

This application claims priority to and the benefit of Chinese Patent Application No. 202311614381.8, filed on Nov. 28, 2023, the disclosure of which is incorporated herein by reference in its entirety.

TECHNICAL FIELD

The present disclosure relates to storage technologies, and more particularly, to memory chips and operating methods thereof.

BACKGROUND

In a NOR Flash memory after an erase operation, an initial state of each memory cell is "1". Then, if data "0" is to be written into a memory cell, the memory cell needs to be programmed so as to change the initial state "1" of the memory cell to a state "0". On the other hand, if data "1" is to be written into another memory cell, another memory cell does not need to be programmed.

Therefore, if one programming operation is performed between two erase operations on a memory cell, the memory cell will have high accuracy. On the other hand, in order to reduce a number of erase operations while ensuring accuracy, it is advantageous to identify some memory cells on each of which multiple programming operations may be performed between two erase operations.

SUMMARY

In a first aspect, one or more embodiments of the present disclosure provide an operating method of a memory chip. The operating method includes: determining an operating state of a storage space of the memory chip corresponding to a write instruction; and performing one of: enabling an error correction mechanism during a read process for the storage space in response to determining that the operating state of the storage space is an error correction protection state; and disabling the error correction mechanism during the read process for the storage space in response to determining that the operating state of the storage space is a multiple programmed state.

In a second aspect, one or more embodiments of the present disclosure provide a memory chip. The memory chip includes: one or more storage spaces; a first logic circuit configured to determine an operating state of a storage space of the one or more storage spaces of the memory chip corresponding to a write instruction; and a finite-state machine configured to perform one of: enabling an error correction mechanism during a read process for the storage space in response to determining that the operating state of the storage space is an error correction protection state; and disabling the error correction mechanism during the read process for the storage space in response to determining that the operating state of the storage space is a multiple programmed state.

DETAILED DESCRIPTION

Some embodiments of the present disclosure will be described in detail below in connection with the accompanying drawings. The embodiments are described for illustrative purposes only and are not intended to limit the present disclosure.

In addition, the terms "first" and "second" are only used for descriptive purposes and cannot be understood as indicating or implying relative importance or implicitly indicating a number of indicated technical features. Therefore, the terms "first" and "second" may indicate including one or more of the described features, explicitly or implicitly. In the description of the present disclosure, "a plurality of" means two or more, unless otherwise explicitly and specifically limited.

Figure 1:
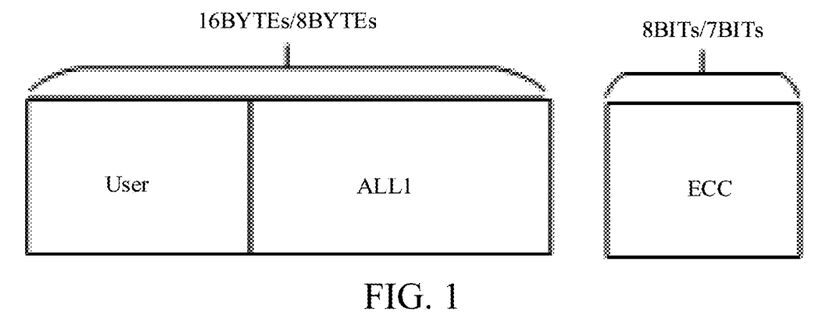
FIG. 1 is a schematic diagram of a data storage structure of each memory unit in a page buffer of a memory chip in the related art.
Figure 2:
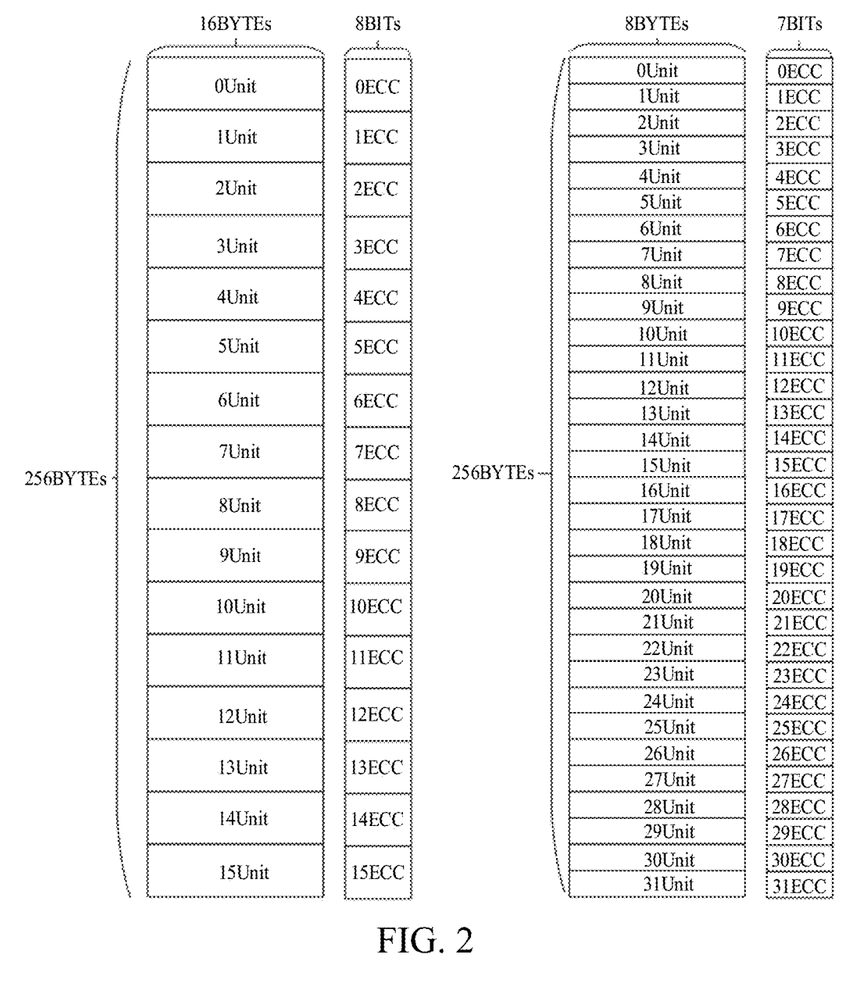
FIG. 2 is a schematic structural diagram of the page buffer with the data storage structure shown in FIG. 1.

FIG. 1 is a schematic diagram of a data storage structure of each memory unit in a page buffer of a memory chip in the related ar. FIG. 2 is a schematic structural diagram of the page buffer with the data storage structure shown in FIG. 1. A page buffer or data input buffer of an NOR Flash is generally 256 bytes. Calculation of an error correction mechanism of NOR Flash is generally performed with 16 bytes or 8 bytes as a unit to obtain a corresponding initial error correction code (ECC). The ECC corresponding to each unit is 8 bits or 7 bits. The ECC generally adopts a Hamming code, which can correct a 1 bit error in a unit of 16 bytes or 8 bytes.

User is used to represent user data or input data, and ALL1 represents that each bit value of the input data is a logical value "1".

FIG. 2 is a schematic structural diagram of the page buffer with the data storage structure shown in FIG. 1. A page buffer of 256 bytes is taken as an example herein. In some examples, each page buffer is divided into 16 units (0 Unit, . . . , and 15 Unit) with 16 bytes as one unit. The error correction mechanism is performed on each of the 16 units to obtain an ECC of 8 bits. For example, the error correction mechanism is performed on the 0 Unit to obtain a 0ECC of 8 bits, and by analogy, the error correction mechanism is performed on the 15 Unit to obtain a 15ECC of 8 bits. In some examples, each page buffer is divided into 32 units (0 Unit, . . . , and 31 Unit) with 8 bytes as one unit. The error correction mechanism is performed on each of the 32 units to obtain an ECC of 7 bits. For example, the error correction mechanism is performed on the 0 Unit to obtain a 0ECC of 7 bits, and by analogy, the error correction mechanism is performed on the 31 Unit unit to obtain a 31ECC of 7 bits.

Figure 3:
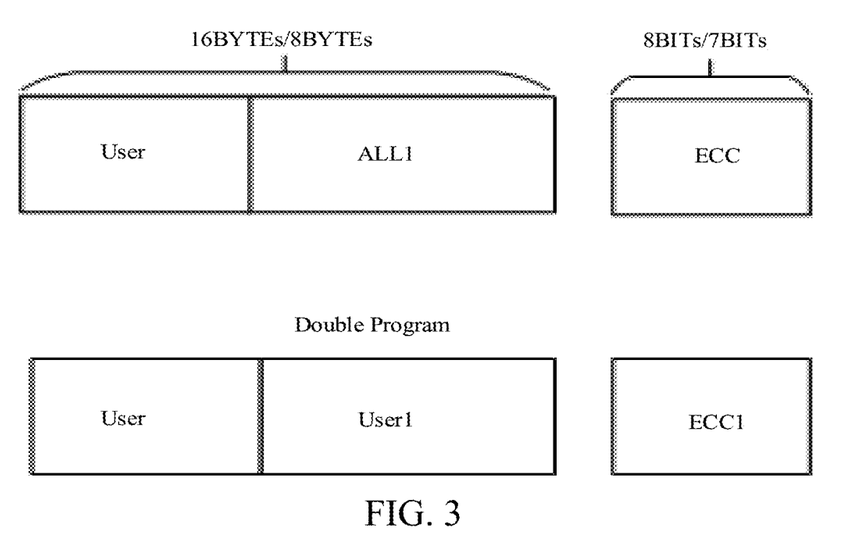
FIG. 3 is a schematic diagram illustrating a defect of memory cells being multiple programmed in the related art.

FIG. 3 is a schematic diagram illustrating a defect of memory cells being multiple programmed in the related art. In the NOR Flash, an initial state of each memory cell is "1". Programming is to change the state "1" of a memory cell, into which data "0" is written, to a state "0". While a corresponding memory cell, into which data "1" is written, does not need to be programmed. Generally, an erase operation is required, since the programming operation cannot change original data "0" in the memory cell to "1".

When the user data or input data is less than 16 bytes or 8 bytes of each unit, the user data and all original "1" in the unit are combined to calculate ECC (8 bits or 7 bits), and the user data and ECC are programmed onto the memory cell of the NOR FLASH. Before erasing the memory cells, after all-1 part of these memory cells is reprogrammed, the error correction code will be recalculated to obtain ECC1. If ECC1 is different from ECC, due to the multiple programming in one memory cell without erasing, the logic value "1" in ECC1 cannot replace the logic value "0" in ECC, which will cause read data of ECC1 to be incorrect, and thus an error occurred during the process. Of course, in some examples, ECC can also be calculated based on 0(s) in the memory cells.

It can be seen that performing a programming operation on two erase operations on the same memory cell still has high accuracy. However, in order to improve a storage life or operating efficiency, two or more programming operations need to be performed between two erase operations.

Figure 4:
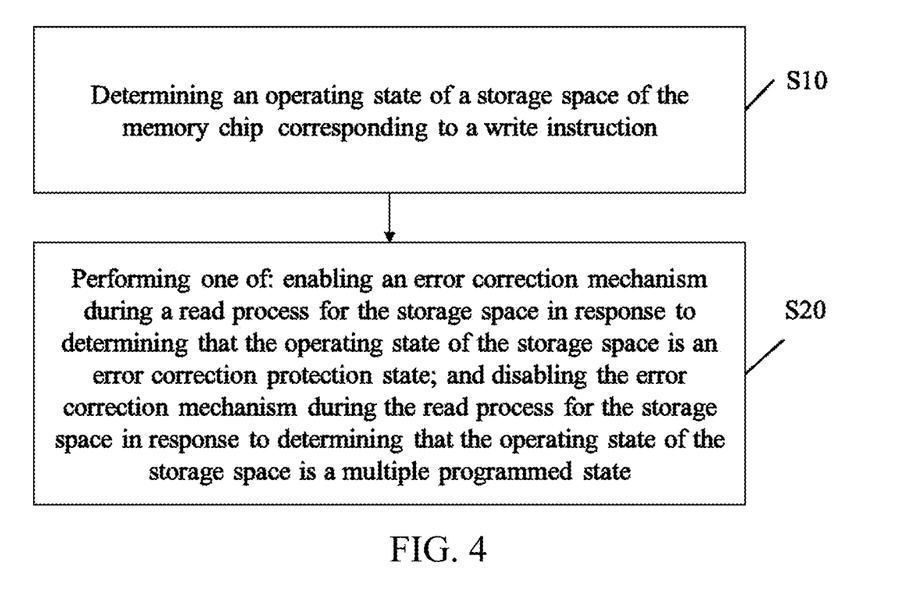
FIG. 4 is a schematic flowchart of an operating method of a memory chip according to some embodiments of the present disclosure.

In some embodiments of the present disclosure, an operating method of a memory chip is provided. As shown in FIG. 4, the operating method includes the following operations:

in operation S10, an operating state of storage space of the memory chip corresponding to a write instruction is determined, where the operating state includes an error correction protection state or a multiple programmed state; and in operation S20: one of the following operations is performed: enabling an error correction mechanism during a read process for the storage space in response to determining that the operating state of the storage space is an error correction protection state; and disabling the error correction mechanism during the read process for the storage space in response to determining that the operating state of the storage space is a multiple programmed state.

It can be understood that, through the operating method, the operating state of the storage space corresponding to the write instruction may be determined, and then, in the read process, the error correction mechanism may be enabled for the storage space in the error correction protection state or the error correction mechanism may be disabled for the storage space in the multiple programmed state. In this way, the storage space in the multiple programmed state may be recognized, allowing performing multiple programming operations thereon, which reduces a number of erase operations and further prevents mischecks caused by errors in some bits of the error correction code.

Furthermore, on the basis of the above, disabling the error correction mechanism in the read process for the storage space in the multiple programmed state may improve read accuracy, compared to enabling the error correction mechanism that is more likely to cause read errors; and enabling the error correction mechanism in the read process for the storage space in the error correction protection state may improve read accuracy since no multiple programming operation is performed on the storage space in the error correction protection state, compared to disabling the error correction mechanism that is more likely to cause read errors.

It should be noted that how to determine whether the storage space is in the multiple programmed state is not limited to the method(s) provided in the present disclosure. For example, a determination as to whether the storage space is in the multiple programmed state may be determined by setting count bits or flag bits (e.g., one or more first flag bits, one or more second flag bits, and one or more error correction bits for storing an error correction code).

Figure 6:
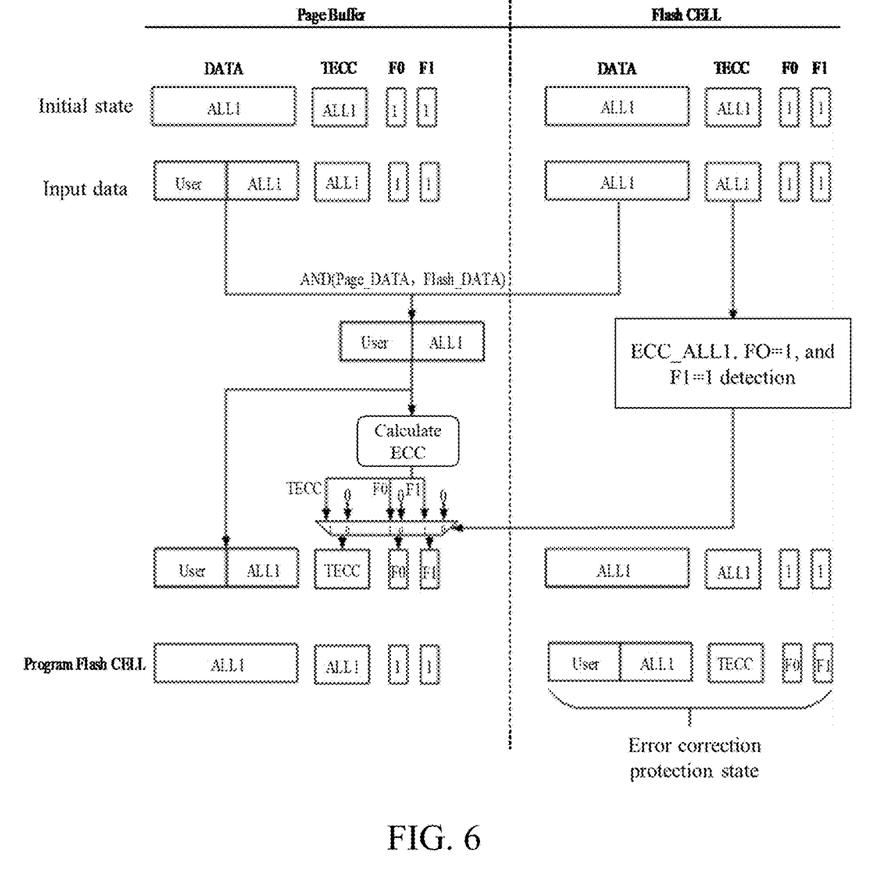
FIG. 6 is a schematic diagram of a process of representing an error correction protection state according to some embodiments of the present disclosure.
Figure 7:
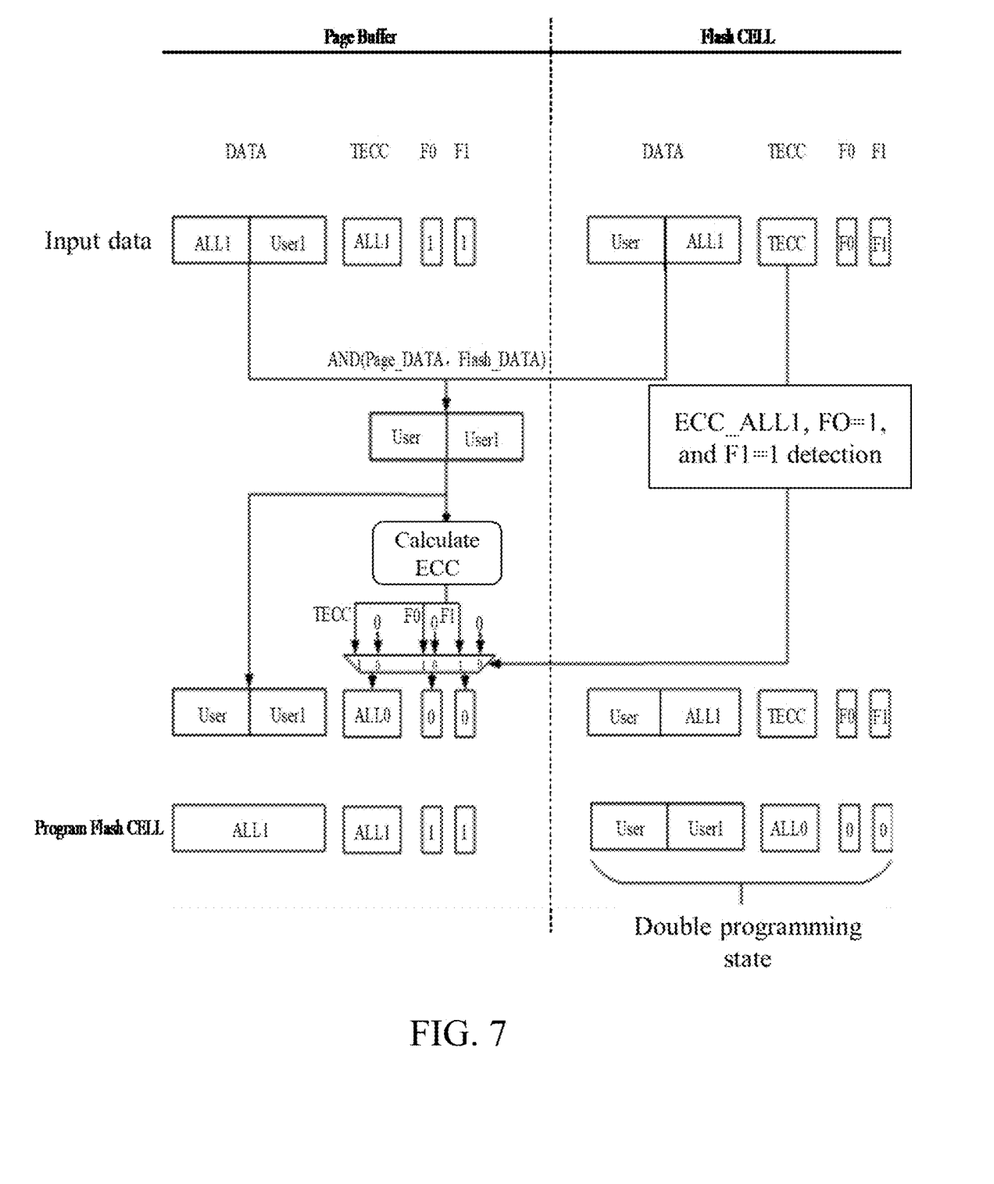
FIG. 7 is a schematic diagram of a process of representing a multiple programmed state according to some embodiments of the present disclosure.

The storage space includes a page buffer (e.g., a page buffer shown in FIGS. 6-7) and a plurality of memory units (e.g., a flash shown in FIGS. 6-7). The first flag bits (e.g., F0 as shown in FIGS. 6-7) include a first buffer flag bit located in the page buffer and a first storage flag bit located in each of the memory units. The second flag bits (e.g., F1 as shown in FIGS. 6-7) include a second buffer flag bit located in the page buffer and a second storage flag bit located in each memory unit. The error correction bits (e.g., TECC as shown in FIGS. 6-7) include one or more buffer error correction bits located in the page buffer and one or more storage error correction bits located in each memory unit. The operating state of the storage space may be represented by setting the first flag bits, the second flag bits, and the error correction bits.

The first storage flag bits have a first storage flag initial value or a first storage flag final value, wherein the first storage flag initial value is a value of the first storage flag bit before input data corresponding to the write instruction is written into each memory unit, and the first storage flag final value is a value of the first storage flag bit after the input data corresponding to the write instruction is written into each memory unit.

The second storage flag bits have a second storage flag initial value or a second storage flag final value, wherein the second storage flag initial value is a value of the second storage flag bit before the input data corresponding to the write instruction is written into each memory unit, and the second storage flag final value is a value of the second storage flag bit after the input data corresponding to the write instruction is written into each memory unit.

The storage error correction bits have a storage error correction initial value or a storage error correction final value, wherein the storage error correction initial value is a value of the storage error correction bits before the input data corresponding to the write instruction is written into each memory unit, and the storage error correction final value is a value of the storage error correction bits after the input data corresponding to the write instruction is written into each memory unit.

It should be noted that the operating state of the storage space may be determined based on the first storage flag final value, the second storage flag final value, and the storage error correction final value.

In some embodiments, the storage space includes a storage array, and the operating state of the storage space may be determined in any of the following three ways:

in a first way, determining the operating state of the storage space through at least one flag bit in the storage array; in a second way, determining the operating state of the storage space through a storage error correction final value and at least one storage flag final value in the storage array; or in a third way, determining the operating state of the storage space through a storage error correction final value, at least one storage flag final value, and intermediate comparison data in the storage array.

The storage space with the corresponding operation state may be memory units of 16 bytes or 8 bytes.

The first buffer flag bit has a first buffer flag initial value or a first buffer flag updated value. The second buffer flag bit has a second buffer flag initial value or a second buffer flag updated value. The buffer error correction bits have a buffer error correction initial value or one or more buffer error correction updated values. The first buffer flag updated value, the second buffer flag updated value, and the buffer error correction updated values are respectively assigned as the first storage flag final value, the second storage flag final value, and the storage error correction final value.

The first buffer flag updated value is one of "0", "1", and a first buffer flag calculated value. The second buffer flag updated value is one of "0", "1", and a second buffer flag calculated value. The buffer error correction updated values are all "0", all "1", and all a buffer error correction calculated value.

It should be noted that the first buffer flag updated value, the second buffer flag updated value, and the buffer error correction updated values may be determined based on the first stored flag initial value, the second stored flag initial value, and the storage error correction initial value.

Page buffer data is data of data bits in the page buffer after the input data is written into the page buffer. Storage data is data of data bits in each memory unit before the input data is written into the each memory unit.

It should be noted that the first buffer flag calculated value, the second buffer flag calculated value, and the buffer error correction calculated value may be determined based on the page buffer data and the storage data.

It should be noted that in some other embodiments, the error correction mechanism may also be disabled in the read process for the storage space in the error correction protection state. This can reduce error correction processes in the read process and improve a read speed or read efficiency.

Figure 5:
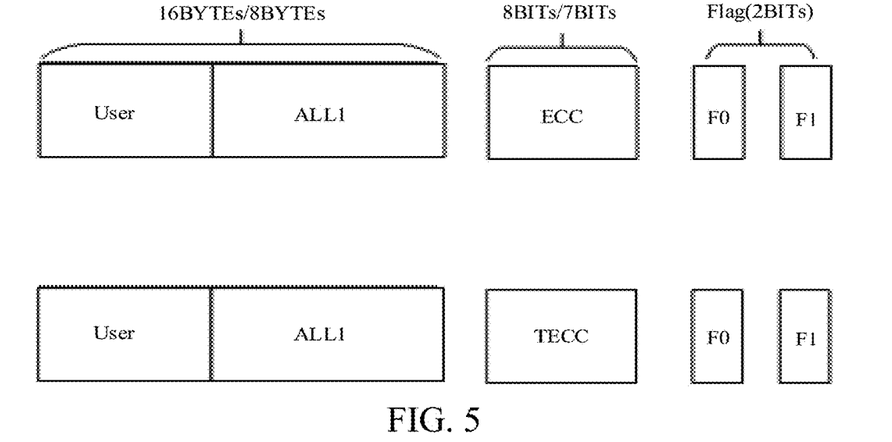
FIG. 5 is a schematic diagram of an error correction conversion process according to some embodiments of the present disclosure.

FIG. 5 is a schematic diagram of an error correction conversion process according to some embodiments of the present disclosure. For units of 16 bytes/8 bytes, the initial state of these units is ALL1, ALL1 means that initial states of these units are all 1. A corresponding ECC is calculated based on the user data (User) input in the storage space and data in the initial state that has not been written. Flag bits of 2 bits may be further obtained, i.e., F0 of 1 bit and F1 of 1 bit.

In some cases, the ECC needs to be converted to obtain the corresponding buffer error correction calculated value. Then, the error correction protection state or the multiple programmed state may be determined based on the buffer error correction calculated value. Alternatively, in order to improve accuracy, the error correction protection state or the multiple programmed state of the storage space may be determined based on the first storage flag final value, the second storage flag final value, and the storage error correction final value. A specific process of this conversion is detailed hereinafter.

It should be noted that TECC is used to represent the error correction bits, F0 is used to represent the first flag bits, and F1 is used to represent the second flag bits. TECC, F0, and F1 further include TECC, F0, and F1 in the storage array or memory unit, TECC, F0, and F1 in the initial state in the page buffer, and calculated TECC, F0, and F1.

FIG. 6 is a schematic diagram of an operation flow of the error correction protection state according to some embodiments of the present disclosure. In a memory chip, in an initial state (that is, after an erase operation and yet without a programming operation), data (DATA), TECC, F0, and F1 in the Page Buffer are all 1, and DATA, TECC, F0, and F1 in the memory unit (Flash CELL) of a storage array are also all 1. ALL1 means that corresponding data are all logical values "1".

After input data (User) corresponding to a write instruction is written into the page buffer, in some embodiments, the page buffer is a buffer, and TECC, F0, and F1 in the Page Buffer are all 1 (that is, the initial state has not changed yet)), TECC, F0, and F1 in the memory unit (Flash CELL) of the storage array are all 1, and the DATA in the Page Buffer is updated to the input data+the data in the initial state (User+ALL1), the DATA in the memory unit (Flash CELL) of the storage array is ALL1. At this time, the data in the Page buffer may be referred to as Page_DATA, and the data in the storage array may be referred to as Flash_DATA.

An AND logic operation (that is, AND (Page_DATA, Flash_DATA)) is performed on Page_DATA and Flash_DATA, to obtain corresponding intermediate comparison data. An error correction mechanism is performed on the intermediate comparison data to obtain a corresponding initial error correction code (ECC). The intermediate comparison data is written back to the Page Buffer. The calculated TECC, F0, and F1 are obtained based on the ECC and the intermediate comparison data. An all-1 detection (i.e., ECC_ALL1, F0=1, and F1=1 detection) is performed on TECC, F0, and F1 in the storage array. When TECC, F0, and F1 in the storage array are all 1, TECC, F0, and F1 in the storage array are modified to the calculated logical values of TECC, F0, and F1.

The storage array is programmed to write the data in the Page Buffer (User+ALL1) to the corresponding memory unit (Flash CELL), which is referred to as Program Flash CELL. At this time, the data, TECC, F0, and F1 in the Page Buffer are all "1", and the logical values of TECC, F0, and F1, and the data in the storage array are the calculated logical values of TECC, F0, F1, and the data (User+ALL1), respectively. This state is the error correction protection state.

It should be noted that after those data in the Page Buffer is written to the storage array, these data in the Page Buffer will be reset to "1".

FIG. 7 is a schematic diagram of an operation flow of a multiple programmed state according to some embodiments of the present disclosure. Based on FIG. 6, after input data (User1) corresponding to a write instruction is written into the page buffer, in some embodiments, the page buffer is a buffer, and TECC, F0, and F1 are all 1, the data (DATA) in the Page Buffer is data (ALL1+User1). The DATA in the memory unit (Flash CELL) of the storage array is the previous data (User+ALL1), TECC, F0, and F1 are final states in FIG. 6. At this time, the data in the page Buffer may be referred to as Page_DATA, and the data in the storage array may be referred to as Flash_DATA.

A AND logic operation (that is, AND (Page_DATA, Flash_DATA)) is performed on Page_DATA and Flash_DATA, to obtain corresponding intermediate comparison data. The intermediate comparison data is written back to the Page Buffer, and is calculated to determine a corresponding initial error correction code (ECC). The calculated TECC, F0, and F1 are obtained based on the ECC and a user's input data (that is, the intermediate comparison data (User, User1)). An all-1 detection (i.e., ECC_ALL1, F0=1, and F1=1 detection) is performed on TECC, F0, and F1 in the storage array. When TECC, F0, and F1 in the storage array are not all 1, TECC, F0, and F1 whose logic values are all "0" are obtained.

The memory units in the storage array are programmed to modify TECC, F0 and F1 in the storage array to logical values "0", and write the data (User+User1) in the Page Buffer to the storage array.

At this time, the data, TECC, F0, and F1 in the Page Buffer are all logical values "1". TECC, F0, and F1 in the storage array are all logical values "0", and the data in each memory unit is data (User+User1). This state is the multiple programmed state. In this case, the error correction mechanism is disabled.

It should be noted that after the data (User+User1) in the Page Buffer is written to the storage array, those data in the page buffer will be set (returned) to the logical values "1".

Generally, the calculated TECC=ECC, and when ECC is all 0, values other than all 0 needs to be used as the calculated TECC. Of course, this is one of the solutions, and there can also be other definitions. For example, ECC defined as all 1 or other values represents the multiple programmed state, and the calculated TECC performs corresponding operations.

Figure 8:
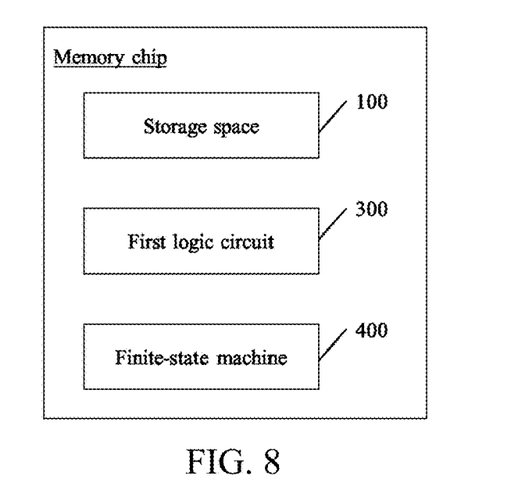
FIG. 8 is a schematic structural diagram of a memory chip according to some embodiments of the present disclosure.
Figure 9:
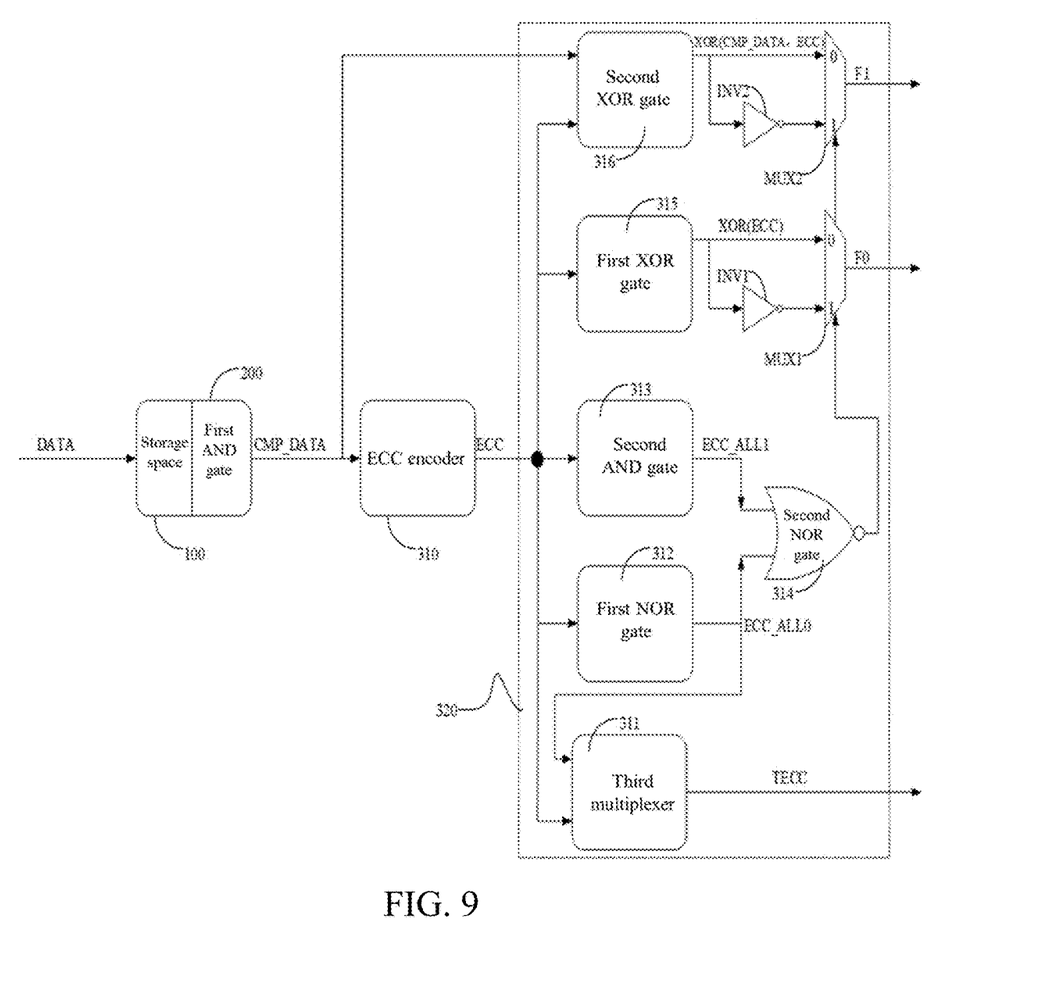
FIG. 9 is schematic structural diagram of another memory chip according to some embodiments of the present disclosure.

In some embodiments, a memory chip is provided. As shown in FIGS. 8 and 9. The memory chip further includes one or more storage spaces 100, a first logic circuit 300 and a finite-state machine (FSM) 400. The first logic circuit 300 is used to determine an operating state of storage space 100 of the memory chip corresponding to a write instruction, where the operating state includes an error correction protection state or a multiple programmed state. The finite-state machine 400 is used to perform one of: enabling an error correction mechanism during a read process for the storage space in response to determining that the operating state of the storage space is an error correction protection state; and disabling the error correction mechanism during the read process for the storage space in response to determining that the operating state of the storage space is a multiple programmed state.

It can be understood that the memory chip provided herein may first determine the operating state of the storage space 100 corresponding to the write instruction, and then enable the error correction mechanism for the storage space 100 in the error correction protection state or disable the error correction mechanism for the storage space 100 in the multiple programmed state in the read process. In this way, the storage space 100 in the multiple programmed state may be recognized, allowing performing multiple programming operations thereon, which reduces a number of erase operations and further prevents mischecks caused by errors in some bits of the error correction code.

Furthermore, on the basis of the above, disabling the error correction mechanism in the read process for the storage space 100 in the multiple programmed state may improve read accuracy, compared to enabling the error correction mechanism that is more likely to cause read errors; and enabling the error correction mechanism in the read process for the storage space 100 in the error correction protection state may improve read accuracy since no multiple programming operation is performed on the storage space 100 in the error correction protection state, compared to disabling the error correction mechanism that is more likely to cause read errors.

It should be noted that the above-mentioned memory chip may be, but is not limited to, an NOR Flash, and may also be other applicable memories. The error correction mechanism can be a technology that enables "error checking and correction".

In some embodiments, as shown in FIGS. 8 and 9, the first logic circuit 300 includes a first AND gate 200, an error correction code (ECC) encoder 310 (e.g., a Hamming encoder), and a second logic circuit 320. The first AND gate 200 (e.g., AND (Page_DATA, Flash_DATA) shown in FIG. 6) is used to determine a result of a AND logic operation on the page buffer data and the storage data as intermediate comparison data (CMP_DATA). The ECC encoder 310 is used to calculate an initial ECC based on the intermediate comparison data. The second logic circuit 320 is configured to calculate a second buffer flag calculated value based on the intermediate comparison data and the initial error correction code, and calculate a first buffer flag calculated value and a buffer error correction calculated value based on the initial error correction code.

It should be noted that TECC, F0, and F1 shown in FIG. 9 respectively represent the buffer error correction calculated value, the first buffer flag calculated value, and the second buffer flag calculated value. DATA represents a user's input data.

The second logic circuit 320 includes a first NOT-OR (NOR) gate 312, a second AND gate 313, a second NOT-OR (NOR) logic unit 314, a first exclusive-OR (XOR) gate 315, a first inverter INV1 (e.g., an OR gate), a second XOR gate 316, a second inverter INV2 (e.g., an OR gate), a first multiplexer MUX1, a second multiplexer MUX2, and a third multiplexer 311.

The first NOT-OR (NOR) gate 312 is configured to output a first logical detection result as to whether one or more bit values of the initial error correction code are all logical values "0".

It should be noted that the first NOR gate 312 is configured to output a logic value "1" when the initial error correction codes are all logic values "0", i.e., ECC_ALL0. When the initial error correction codes are not all logical values "0", the first NOR gate 312 outputs the logical value "0".

The second AND gate 313 is configured to output a second logical detection result whether the one or more bit values of the initial error correction code are all logical values "1".

It should be noted that the second AND gate 313 is used to output the output logical value "1" when the initial error correction codes are all logical values "1", i.e., ECC_ALL1. When the initial error correction codes are not all logical values "1", the second AND gate 313 outputs the logical value "0".

The second NOR gate 314 is configured to determine a NOR operation result between the first logical detection result and the second logical detection result as intermediate control data.

The first XOR gate 315 is used to perform a parity check (i.e., XOR(ECC)) on the initial error correction code to obtain a parity check result.

The first inverter INV1 is used to invert the parity check result to obtain a non-parity check result.

The second XOR gate 316 is used to perform an exclusive-OR (XOR), that is, XOR (CMP_DATA, ECC), on the intermediate comparison data and the initial error correction code to obtain an XOR operation result.

The second inverter INV2 is used to invert the XOR operation result to obtain a non-XOR operation result.

The first multiplexer (MUX) MUX1 is used to, in response to determining that the intermediate control data is "1", select the non-parity check result as the second buffer flag calculated value. The first multiplexer MUX1 is used to, in response to determining that the intermediate control data is "0", select the parity check result as the second buffer flag calculated value.

The second multiplexer MUX2 is used to, in response to determining that the intermediate control data is "1", select the non-XOR operation result as the first buffer flag calculated value. The second multiplexer MUX2 is used to, in response to determining that the intermediate control data is "0", select the XOR operation result as the first buffer flag calculated value.

The third multiplexer 311 is configured to: in response to determining that the one or more bit values of the initial error correction code are all logical values "0", convert a code different from the initial error correction code as the buffer error correction calculated value; or in response to determining that the one or more bit values of the initial error correction code are not all logical values "1", directly outputting the initial error correction code as the buffer error correction calculated value.

In some embodiments, the logic gates (e.g., the AND gate, the OR gate, the XOR gate, the NOR gate) as described herein may include resistors, capacitors, diodes, triodes, transistors, or the like, or a combination thereof. For example, the logic gates include a Complementary Metal-Oxide-Semiconductor (CMOS), an N-channel metal-oxide semiconductor (NMOS), a P-channel metal-oxide semiconductor (PMOS), or other transistors, or any combination thereof. In some embodiments, the logic gates may also include a logic chip. Additionally or alternatively, the logic gates may be implemented by hardware or software, which is not limited in the present disclosure.

To sum up, after the user data is written into the storage array, TECC, F0, and F1 in the storage array are all logic values "0", which are used to define or represent the multiple programmed state, that is, performing multiple programming operations on one memory unit (NOR FLASH CELL) before erasing the one memory unit. After the user data is written into the storage array, TECC, F0, and F1 in the storage array are neither all 1 nor all 0, and are used to define or represent the error correction protection state, that is, performing merely one programming operation on one memory unit (NOR FLASH CELL) before erasing the one memory unit.

F0 may be used to represent that ECC can correct 1 bit errors and detect 2 bits errors. F1 may be used to distinguish the multiple programmed state from others.

It can be understood that the present disclosure can determine a memory unit capable of the multiple programmed state based on the user's input data, which can improve a selection width of the user or applicability compared with only performing one programming operation for each erase.

In some embodiments, the operating method further includes: configuring the operating state to further include a part programmed state; if a number of written memory units in the storage space that is in the part programmed state is less than a threshold, enabling the error correction mechanism in the read process; or if the number of written memory units in the storage space that is in the part programmed state is greater than or equal to the threshold, disabling the error correction mechanism in the read process.

It should be noted that enabling the error correction mechanism in the read process for the storage space in the part programmed state can improve read accuracy. Disabling the error correction mechanism in the read process for the storage space in the part programmed state can improve a read speed.

Regarding a determination as to whether the operating state of the storage space is the part programmed state, the operating state of the storage space may be determined based on the first storage flag final value, the second storage flag final value, and the storage error correction final value as the part programmed state of the storage space.

Specifically, in response to determining that the first storage flag final value, the second storage flag final value, and the storage error correction final value are all logic values "1", the operating state of the storage space is determined as the part programmed state, an erased state, or a storage initial state.

It should be noted that the erased state or the storage initial state indicates a state in which a corresponding memory unit has been erased but has not been programmed.

In some embodiments, the memory chip includes one or more first flag bits, one or more second flag bits, and error correction bits that store an error correction code. The first flag bits, the second flag bits, and the error correction bits are used to characterize the operation of the storage space. state.

In some embodiments, the storage space includes a storage array. Data in the first flag bits, the second flag bits, and the error correction bits in the storage array are set as all "1" to represent the part programmed state of the storage space. The data in the first flag bits, the second flag bits, and the error correction bits in the storage array are set as all "0" to represent the multiple programmed state of the storage space. The data in the first flag bits, the second flag bits, and the error correction bits in the storage array are set as neither all "1" nor all "0" to represent the error correction protection state of the storage space.

The "multiple" mentioned herein two or more times.

In the above embodiments, each embodiment is described with its own emphasis. For parts that are not described in detail in a certain embodiment, please refer to the relevant descriptions of other embodiments.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. An operating method of a memory chip, comprising:
   determining an operating state of a storage space of the memory chip corresponding to a write instruction; and
   performing one of: enabling an error correction mechanism during a read process for the storage space in response to determining that the operating state of the storage space is an error correction protection state; and disabling the error correction mechanism during the read process for the storage space in response to determining that the operating state of the storage space is a multiple programmed state,
   wherein two or more programming operations have been performed between two adjacent erase operations in the storage space in the multiple programmed state.

2. The operating method according to claim 1, further comprising:
   setting at least one flag bit to represent the operating state of the storage space,
   wherein the determining of the operating state of the storage space comprises:
   determining the operating state of the storage space based on the at least one flag bit.

3. The operating method according to claim 2, wherein the setting of the at least one flag bit to represent the operating state of the storage space comprises:

configuring the at least one flag bit to comprise one or more first flag bits, one or more second flag bits, and one or more error correction bits for storing an error correction code; and setting the first flag bits, the second flag bits, and the error correction bits to represent the operating state of the storage space.

4. The operating method according to claim 3, wherein the storage space comprises a storage array, and the setting of the first flag bits, the second flag bits, and the error correction bits to represent the operating state of the storage space comprises one of:

setting data in the first flag bits, data in the second flag bits, and data in the error correction bits in the storage array as all "1" to represent a part programmed state, an erased state, or a storage initial state of the storage space;

setting the data in the first flag bits, the data in the second flag bits, and the data in the error correction bits in the storage array as all "0" to represent the multiple programmed state of the storage space; and setting the data in the first flag bits, the data in the second flag bits, and the data in the error correction bits in the storage array as neither all "1" nor all "0" to represent the error correction protection state of the storage space.

5. The operating method according to claim 3, wherein the storage space comprises a page buffer and a plurality of memory units, the first flag bits comprise a first buffer flag bit located in the page buffer and a first storage flag bit located in each of the memory units, the second flag bits comprise a second buffer flag bit located in the page buffer and a second storage flag bit located in the each of the memory units, the error correction bits comprise one or more buffer error correction bits located in the page buffer and one or more storage error correction bits located in the each of the memory units, and the setting of the first flag bits, the second flag bits, and the error correction bits to represent the operating state of the storage space comprises:

setting the first storage flag bit to be a first storage flag initial value or a first storage flag final value, wherein the first storage flag initial value is a value of the first storage flag bit before input data corresponding to the write instruction is written into the each of the memory units, and the first storage flag final value is a value of the first storage flag bit after the input data corresponding to the write instruction is written into the each of the memory units;

setting the second storage flag bit to be a second storage flag initial value or a second storage flag final value, wherein the second storage flag initial value is a value of the second storage flag bit before the input data corresponding to the write instruction is written into the each of the memory units, and the second storage flag final value is a value of the second storage flag bit after the input data corresponding to the write instruction is written into the each of the memory units;

setting the storage error correction bits to be a storage error correction initial value or a storage error correction final value, wherein the storage error correction initial value is a value of the storage error correction bits before the input data corresponding to the write instruction is written into the each of the memory units, and the storage error correction final value is a value of the storage error correction bits after the input data corresponding to the write instruction is written into the each of the memory units; and representing the operating state of the storage space by the first storage flag final value, the second storage flag final value, and the storage error correction final value.

6. The operating method according to claim 5, further comprising:

setting the first buffer flag bit to be a first buffer flag initial value or a first buffer flag updated value, setting the second buffer flag bit to be a second buffer flag initial value or a second buffer flag updated value, and setting the buffer error correction bits to be a buffer error correction initial value or a buffer error correction updated value; and assigning the first buffer flag updated value, the second buffer flag updated value, and the buffer error correction updated value respectively as the first storage flag final value, the second storage flag final value, and the storage error correction final value.

7. The operating method according to claim 6, further comprising:

setting the first buffer flag updated value as one of 0, 1, and a first buffer flag calculated value;

setting the second buffer flag updated value as one of 0, 1, and a second buffer flag calculated value;

setting the buffer error correction updated value as one of all "0", all "1", and a buffer error correction calculated value; and determining the first buffer flag updated value, the second buffer flag updated value, and the buffer error correction updated value based on the first storage flag initial value, the second storage flag initial value, and the storage error correction initial value.

8. The operating method according to claim 7, further comprising:

determining the first buffer flag calculated value, the second buffer flag calculated value, and the buffer error correction calculated value based on page buffer data and storage data, wherein the page buffer data is data of data bits in the page buffer after the input data is written into the page buffer, and the storage data is data of data bits in the each of the memory units before the input data is written into the each of the memory units.

9. The operating method according to claim 8, wherein the determining of the first buffer flag calculated value, the second buffer flag calculated value, and the buffer error correction calculated value based on the page buffer data and the storage data comprises:

determining a result of an AND logical operation on the page buffer data and the storage data as intermediate comparison data;

calculating an initial error correction code based on the intermediate comparison data; and calculating the second buffer flag calculated value based on the intermediate comparison data and the initial error correction code, and calculating the first buffer flag calculated value and the buffer error correction calculated value based on the initial error correction code, wherein a result of a NAND operation on a first logical detection result indicating whether each bit value of the initial error correction code is a logical value "0" and a second logical detection result indicating whether each bit value of the initial error correction code is a logical value "1" is determined as intermediate control data;

wherein a parity check is performed on the initial error correction code to obtain a parity check result, and the parity check result is inverted to obtain a non-parity check result;

wherein an exclusive-OR (XOR) operation is performed on the intermediate comparison data and the initial error correction code to obtain an XOR operation result, and the XOR operation result is inverted to obtain a non-XOR operation result;

wherein in response to determining that the intermediate control data is "1", the non-XOR operation result and the non-parity check result are selected as the first buffer flag calculated value and the second buffer flag calculated value, respectively, or in response to determining that the intermediate control data is "0", the XOR operation result and the parity check result are selected as the first buffer flag calculated value and the second buffer flag calculated value, respectively; and wherein in response to determining that each bit value of the initial error correction code is a logical value "0", the initial error correction code is converted into a different code as the buffer error correction calculated value, or in response to determining that at least one bit value of the initial error correction code is not the logical value "0", outputting the initial error correction code as the buffer error correction calculated value.

10. The operating method according to claim 7, wherein the determining of the operating state of the storage space comprises one of:

in response to determining that each of the first storage flag final value, the second storage flag final value, and the storage error correction final value is all "0", determining that the operation state of the storage space is the multiple programmed state; and in response to determining that the first storage flag final value, the second storage flag final value, and the storage error correction final value are respectively the first buffer flag calculated value, the second buffer flag calculated value, and the buffer error correction calculated value, determining that the operation state of the storage space is the error correction protection state.

11. The operating method according to claim 3, further comprising:

in response to determining that the operation state of the storage space is a part programmed state, performing one of: enabling the error correction mechanism during the read process for the storage space in response to determining that a number of written memory units in the storage space is less than a threshold; and disabling the error correction mechanism during the read process for the storage space in response to determining that the number of the written memory units in the storage space is greater than or equal to the threshold.

12. The operating method according to claim 11, wherein the storage space comprises a page buffer and a plurality of memory units, the first flag bits comprise a first buffer flag bit located in the page buffer and a first storage flag bit located in each of the plurality of memory units, the second flag bits comprise a second buffer flag bit located in the page buffer and a second storage flag bit located the each of in the plurality of memory units, the error correction bits comprise one or more buffer error correction bits located in the page buffer and one or more storage error correction bits located in the each of the plurality of memory units, and the setting of the first flag bits, the second flag bits, and the error correction bits to represent the operating state of the storage space comprises:

setting the first storage flag bit to be a first storage flag initial value or a first storage flag final value, wherein the first storage flag initial value is a value of the first storage flag bit before input data corresponding to the write instruction is written into the each of the memory units, and the first storage flag final value is a value of the first storage flag bit after the input data corresponding to the write instruction is written into the each of the memory units;

setting the second storage flag bit to be a second storage flag initial value or a second storage flag final value, wherein the second storage flag initial value is a value of the second storage flag bit before the input data corresponding to the write instruction is written into the each of the memory units, and the second storage flag final value is a value of the second storage flag bit after the input data corresponding to the write instruction is written into the each of the memory units;

setting the storage error correction bits to be a storage error correction initial value or a storage error correction final value, wherein the storage error correction initial value is a value of the storage error correction bits before the input data corresponding to the write instruction is written into the each of the memory units, and the storage error correction final value is a value of the storage error correction bits after the input data corresponding to the write instruction is written into the each of the memory units; and representing the operating state of the storage space by the first storage flag final value, the second storage flag final value, and the storage error correction final value.

13. The operating method according to claim 12, wherein the determining of the operating state of the storage space comprises:

in response to determining that each of the first storage flag final value, the second storage flag final value, and the storage error correction final value is all logic value "1", determining that the operating state of the storage space is the part programmed state.

14. A memory chip, comprising:

one or more storage spaces;

a first logic circuit configured to determine an operating state of a storage space of the one or more storage spaces of the memory chip corresponding to a write instruction; and a finite-state machine configured to perform one of: enabling an error correction mechanism during a read process for the storage space in response to determining that the operating state of the storage space is an error correction protection state; and disabling the error correction mechanism during the read process for the storage space in response to determining that the operating state of the storage space is a multiple programmed state, wherein two or more programming operations have been performed between two adjacent erase operations in the storage space in the multiple programmed state.

15. The memory chip according to claim 14, further comprising one or more first flag bits, one or more second flag bits, and one or more error correction bits for storing an error correction code which are used to represent the operating state of the storage space.

16. The memory chip according to claim 15, wherein the storage space comprises a storage array,
   wherein data in the first flag bits, data in the second flag bits, and data in the error correction bits in the storage array that are all "1" are used to represent a part programmed state, an erased state, or a storage initial state of the storage space;
   the data in the first flag bits, the data in the second flag bits, and the data in the error correction bits in the storage array that are all "0" are used to represent the multiple programmed state of the storage space; or
   the data in the first flag bits, the data in the second flag bits, and the data in the error correction bits in the storage array that are neither all "1" nor all "0" are used to represent the error correction protection state of the storage space.

17. The memory chip according to claim 14, wherein a storage space of the one or more storage spaces comprises one or more first flag bits, one or more second flag bits, and one or more error correction bits for storing an error correction code, and the storage space comprises a page buffer and a plurality of memory units;
   wherein the first flag bits comprise a first buffer flag bit located in the page buffer and a first storage flag bit located in each of the memory units,
   the second flag bits comprise a second buffer flag bit located in the page buffer and a second storage flag bit located in the each of the memory unit, and
   the error correction bits comprise one or more buffer error correction bits located in the page buffer and one or more storage error correction bits located in the each of the memory unit;
   wherein the first storage flag bit has a first storage flag initial value or a first storage flag final value, the first storage flag initial value is a value of the first storage flag bit before input data corresponding to the write instruction is written into the each of the memory unit, and the first storage flag final value is a value of the first storage flag bit after the input data corresponding to the write instruction is written into the each of the memory unit;
   the second storage flag bit has a second storage flag initial value or a second storage flag final value, the second storage flag initial value is a value of the second storage flag bit before the input data corresponding to the write instruction is written into the each of the memory unit, and the second storage flag final value is a value of the second storage flag bit after the input data corresponding to the write instruction is written into the each of the memory unit;
   the storage error correction bits has a storage error correction initial value or a storage error correction final value, the storage error correction initial value is a value of the storage error correction bit before the input data corresponding to the write instruction is written into the each of the memory unit, and the storage error correction final value is a value of the storage error correction bits after the input data corresponding to the write instruction is written into the each of the memory unit; and
   the first logic circuit is further configured to represent the operating state of the storage space by the first storage flag final value, the second storage flag final value, and the storage error correction final value.

18. The memory chip according to claim 17, wherein the first buffer flag bit has a first buffer flag initial value or a first buffer flag updated value, the second buffer flag bit has a second buffer flag initial value or a second buffer flag updated value, and the buffer error correction bits has a buffer error correction initial value or one or more buffer error correction updated values, and
   the first logic circuit is further configured to assign the first buffer flag updated value, the second buffer flag updated value, and the buffer error correction updated values respectively as the first storage flag final value, the second storage flag final value, and the storage error correction final value.

19. The memory chip according to claim 18, wherein:
   the first buffer flag updated value is one of 0, 1, and a first buffer flag calculated value,
   the second buffer flag updated value is one of 0, 1, and a second buffer flag calculated value,
   the buffer error correction updated values are all 0, all 1, and all a buffer error correction calculated value, and
   the first logic circuit is further configured to determine the first buffer flag updated value, the second buffer flag updated value, and the buffer error correction updated values based on the first storage flag initial value, the second storage flag initial value, and the storage error correction initial value.

20. The memory chip according to claim 19, wherein the storage space stores page buffer data and storage data,
   the page buffer data is data of data bits in the page buffer after the input data is written into the page buffer,
   the storage data is data of data bits in the each of the memory units before the input data is written into the each of the memory units; and
   the first logic circuit is further configured to determine the first buffer flag calculated value, the second buffer flag calculated value, and the buffer error correction calculated value based on the page buffer data and the storage data,
   wherein the first logic circuit further comprises:
   a first AND gate configured to determine a result of an AND logical operation on the page buffer data and the storage data as intermediate comparison data;
   an error correction code encoder configured to calculate an initial error correction code based on the intermediate comparison data; and
   a second logic circuit configured to calculate the second buffer flag calculated value based on the intermediate comparison data and the initial error correction code, and calculate the first buffer flag calculated value and the buffer error correction calculated value based on the initial error correction code,
   wherein the second logic circuit comprises:
   a first NOT-OR (NOR) gate configured to output a first logical detection result indicating whether each bit value of the initial error correction code is a logical value "0",
   a second AND gate configured to output a second logical detection result indicating whether each bit value of the initial error correction code is a logical value "1", a second NOT-OR (NOR) gate configured to determine a result of a NOR operation on the first logical detection result and the second logical detection result as intermediate control data, a first exclusive-OR (XOR) gate configured to perform a parity check on the initial error correction code to obtain a parity check result, a first inverter configured to invert the parity check result to obtain a non-parity check result, a second XOR gate configured to perform an exclusive-OR (XOR) operation on the intermediate comparison data and the initial error correction code to obtain an XOR operation result, a second inverter configured to invert the XOR operation result to obtain a non-XOR operation result, a first multiplexer configured to, in response to determining that the intermediate control data is "1", select the non-parity check result as the second buffer flag calculated value, or in response to determining that the intermediate control data is "0", select the parity check result as the second buffer flag calculated value, a second multiplexer configured to, in response to determining that the intermediate control data is "1", select the non-XOR operation result as the first buffer flag calculated value, or in response to determining that the intermediate control data is "0", select the XOR operation result as the first buffer flag calculated value, a third multiplexer configured to, in response to determining that each bit value of the initial error correction code is a logical value "0", convert the initial error correction code into a different code as the buffer error correction calculated value.

* * * * *